Oct. 31, 1950          C. R. SACCHINI          2,528,181
PARKING OF ELECTRICALLY DRIVEN WINDSHIELD WIPERS
Filed Feb. 16, 1949          2 Sheets-Sheet 1
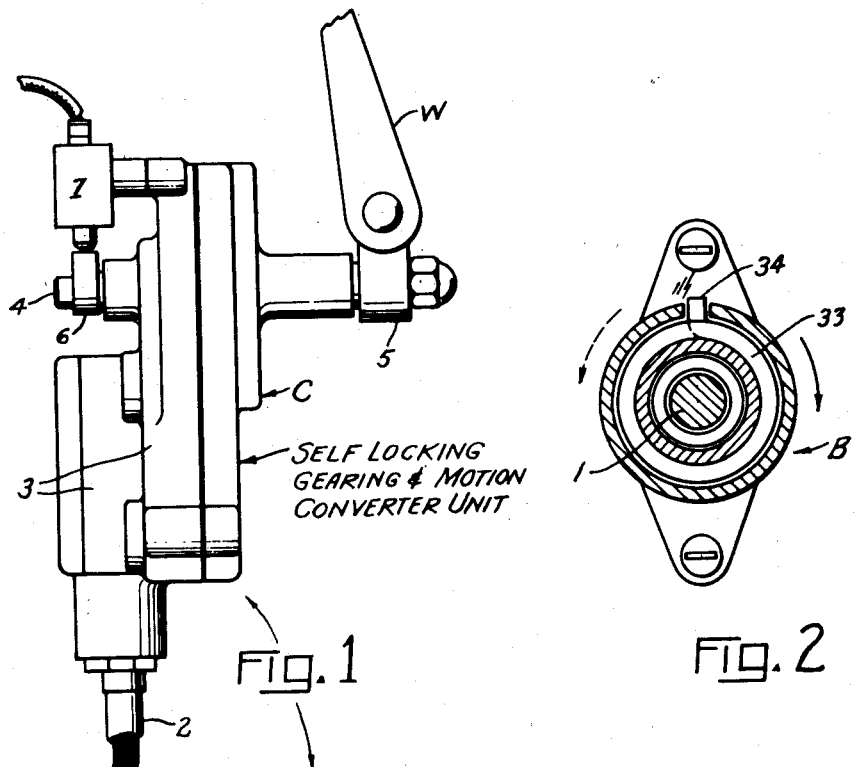
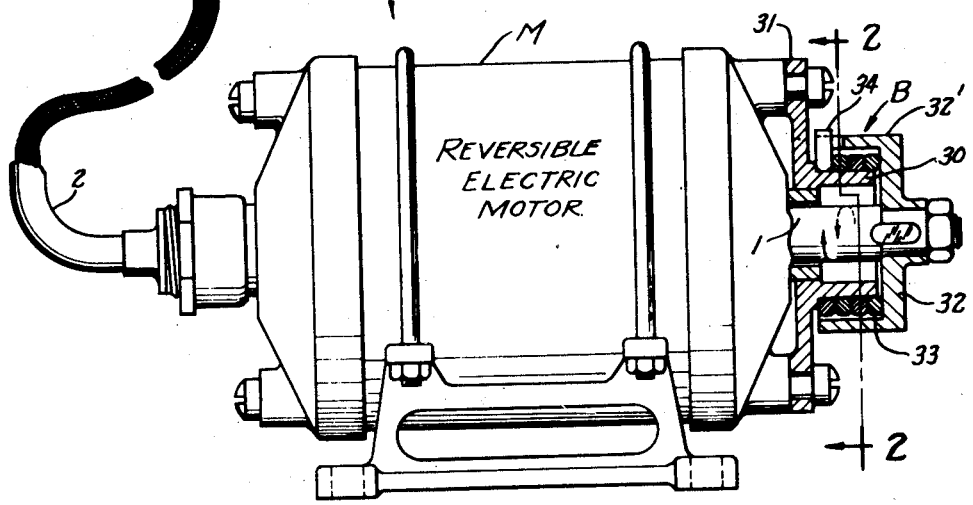
INVENTOR.
COLUMBUS R. SACCHINI
BY George M. Soule
ATTORNEY Oct. 31, 1950      C. R. SACCHINI      2,528,181

PARKING OF ELECTRICALLY DRIVEN WINDSHIELD WIPERS

Filed Feb. 16, 1949      2 Sheets-Sheet 2

NORMAL (E.g. WIPING) OPERATION

PARKING OPERATION

INVENTOR.
COLUMBUS R. SACCHINI
BY George M. Soule
ATTORNEY

Patented Oct. 31, 1950

2,528,181

UNITED STATES PATENT OFFICE 2,528,181

PARKING OF ELECTRICALLY DRIVEN WINDSHIELD WIPERS

Columbus R. Sacchini, Willoughby, Ohio, assignor to The Marquette Metal Products Company, Cleveland, Ohio, a corporation of Ohio Application February 16, 1949, Serial No. 76,732

8 Claims. (Cl. 318—275)

The invention relates to electric-motor-operated windshield wiping mechanisms and particularly to an improved arrangement for parking the wiper blade or equivalent element or elements of such mechanisms accurately and quickly in the desired position or positions, with assurance that the blade or element will not be moved out of parking position, thus indicating the general object.

The invention, more specifically, contemplates provision for parking the blade or blades of wiper mechanisms driven through suitable reduction gearing, etc. by high speed alternating current squirrel-cage type motors such as are being increasingly used as auxiliary drive equipment for aircraft and other vehicles. High speed reversible A. C. motors cannot practicably be stopped for parking of the blades by dynamic braking because of inherent limitations such as the requirement of high wattage direct current in the braking hookup; and "plugging in" stopping methods as conventionally arranged are either unsatisfactory or unsuitable for a variety of reasons.

The instant solution comprises changing of the motor phase sequence to effect electrical conditioning of the motor for reverse, and preventing of actual motor reversal by means of a one-way or anti-reverse brake on the motor which is preferably so arranged as automatically to remove substantially all restraining influence to normal direction operation of the motor. That and the fact that the motor is completely controlled for normal wiping operation and parking by a single manual switch, which may have an automatic delayed action release feature for shutting off all electrical supply current after parking, indicate further objects of the present invention. Others will be made apparent. The disclosed embodiment is illustrative and by way of example only.

Figure 3:
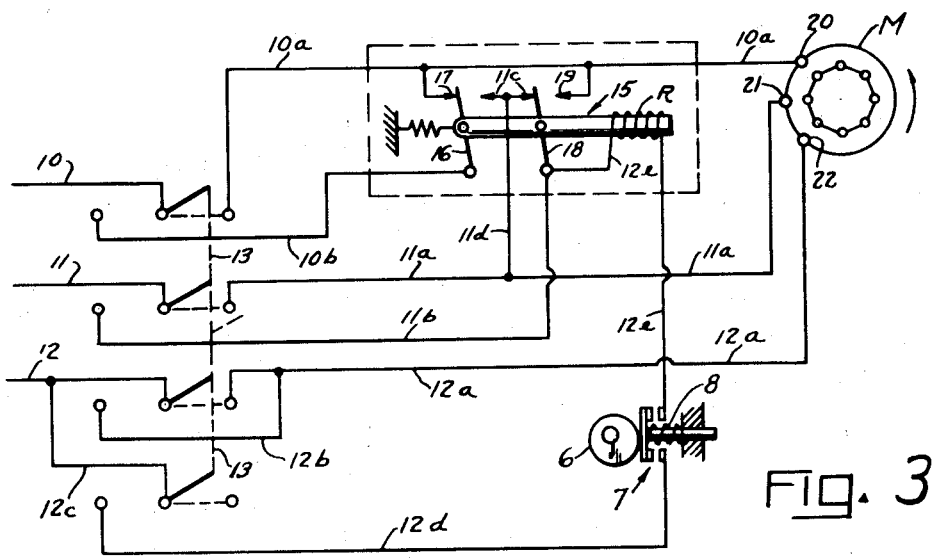
Figure 4:
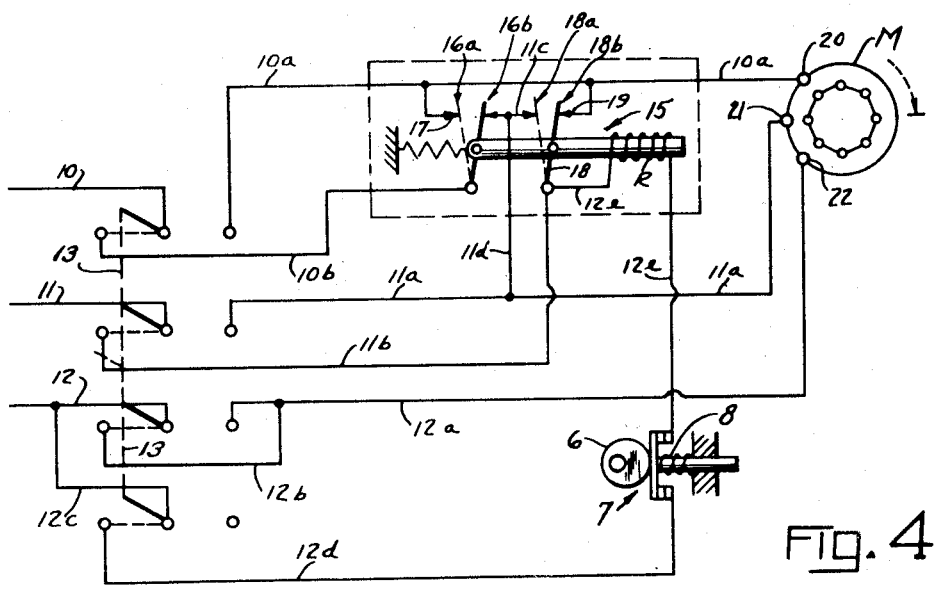
Figure 5:
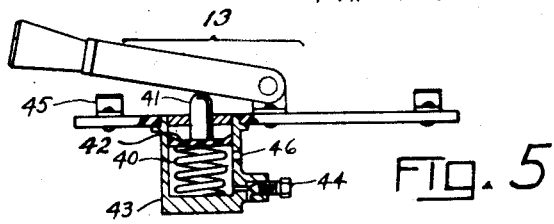

In the drawings, Fig. 1 shows, principally in elevation, a typical arrangement of motor, motion converter and gear unit, the latter supporting a wiper. The motor includes a suitable form of anti-reverse brake, shown in central axial section. Fig. 2 is a cross-sectional view as indicated on Fig. 1. Figs. 3 and 4 are electrical diagrams showing the mechanism adjusted for normal running and parking respectively. Fig. 5 is a sectional schematic view of a delayed action main or master switch throw-out device.

Referring to Fig. 1, the reversible electric motor M is assumed to be a three-phase, induction, squirrel cage type fractional horsepower motor adapted to operate on the usual 400 cycle alternating current at speeds in the magnitude of 10,000 R. P. M. The rotor shaft 1 is connected to typical flexible shafting 2 leading to the reduction gearing and motion converter unit C arranged to drive one or more wipers. An oscillatory output shaft 4 is supported in the housing 3 of the unit; and the wiper, represented by a portion of a drive arm W, may be mounted on one projecting end of the shaft through an arm head section 5. The unit C represents a modification of the gearing and converter unit shown in my prior application, Serial No. 631,075 filed November 27, 1945, now abandoned, owned by the assignee hereof. That unit includes self-locking, high reduction gearing and means for converting rotary into reciprocating or oscillating motion of an output shaft such as 4.

The output shaft 4 of unit C oscillate continually from an assumed parking position of the wiper arm W through successive full strokes, each constituting a cycle, during continued normal rotation of the motor shaft 1. An eccentric cam 6 is arranged on one end of the oscillating shaft 4 so as to operate to close the electrical contacts of a switch 7, preferably of the snap action type commonly known as a micro switch and which is spring-biased to open position (cf spring 8, Figs. 3 and 4). The cam 6 closes the switch contacts on each cycle of operation of the take-off shaft 4, and the cam may be considered as representing any cyclically moving, wiper-connected part. For example, the wiper drive arm itself can be arranged to operate the switch 7.

At the right in Fig. 1 a suitable form of anti-reverse brake B is shown acting on a circular drum portion 30 of the detachable motor housing section 31. The drum is concentric with the shaft 1 and the latter has fastened thereto a driving head member 32 of drum-like form. One end of a helical friction spring 33 is connected to the head as through the intermediary of a toe portion 34 of the spring, Figs. 1 and 2. The spring 33 has its coils normally in light frictional gripping relationship to the drum so as to be self-energizing for locking of the member 32 and the shaft 1 against turning in one direction only, e. g. counter-clockwise, Fig. 2, as indicated by the dotted arrow. Normal driving direction of the shaft 1, per solid arrow, releases the brake by expanding the spring coils; and, if the motor operates at fairly high speed and the spring and other parts are properly designed, centrifugal force applied to the spring which must always turn with the member 32 releases the spring coils from all frictional drag on the drum 30. The shell portion 32' of the driving head may be in tight peripheral contact with relatively enlarged diameter coils of the spring adjacent the toe (not illustrated) to hold the spring centered and to relieve the spring toe from shock load during braking.

The mechanism just described is given as a suitable example of a ratchet type brake. Toothed or roller types could be used instead, preferably so arranged that the movable elements are kept from dragging by centrifugal force (i. e. moving inwardly toward the rotor axis in order to effect anti-rotational locking).

Referring to Fig. 3, the motor M is represented as a three-phase induction motor having appropriate supply lines 10, 11 and 12 normally connected thereto at respective terminals 20, 21 and 22 through the intermediary of a multiple pole, double throw manually operable master switch 13 of any suitable form. Parallel broken lines connecting the switch terminals and contacts illustrate the assumed operating condition of the master switch whereby the feed lines are connected to conductors 10a, 11a and 12a respectively, leading to the motor terminals. Assuming the motor is operating in its forward or normal wiper-driving direction (solid arrows) by the described position of the master switch 13, it will be apparent that none of the additional electrical apparatus shown are charged with current.

Assuming the operator now decides to park the wiper, the switch 13 may be shifted at any time to the terminal-connecting position indicated by the horizontal broken lines in Fig. 4, which position temporarily re-establishes the necessary forward driving connections to the motor. Thereby the motor continues to operate to drive the wiper to parking position. In the typical arrangement illustrated the feed line 10 is connected to the supply line portion 10a through a line portion 10b and a relay switch arm 16 of a relay 15, said arm of the relay switch temporarily remaining in the dotted line position 16a, Fig. 4 (Fig. 3 position of relay). Similarly the supply line 11 is re-connected to the motor through line portion 11b, relay switch arm 18 contacts 11c and line 11d, the switch arm 18 remaining temporarily in its dotted line position 18a Fig. 4. The supply line 12, Fig. 4, is re-connected to motor supply line portion 12a by a jump line 12b. The lowermost arm of the master switch 13 (Fig. 4 position) operates conditionally to establish a shunt energizing circuit for the relay 15 from line 12 to the now-charged branch line 11b through lines 12c, 12d and 12e, the shunt including the normally open contacts of switch 7 and the relay coil R.

The conditional establishment of the relay circuit 12c, 12d, 12e and 11b, as a preliminary to parking of the wiper or wipers, results in further forward driving of the motor M (assuming the wiper is not already in parking position at the time manual switch 13 closes the left hand contacts) until the switch 7 is closed by cam 6. Then the relay 15 moves to the motor-phase-reversing position illustrated by Fig. 4; the motor is brought practically instantly to zero speed and is stalled from going into reverse by the automatic anti-reverse brake B and the wiper is effectively and accurately parked and locked in parked position by the gearing of unit C. By movement of the master switch 13 to any "off" position of its various contact arms, the whole electrical system shown at the right of the master switch may now be deenergized.

If it is desired that the operator be enabled to move the master switch 13 to the parking position and then merely release it after parking has been effected, a suitable return spring such as 40 in Fig. 5 and plunger 41 is arranged to move the switch 13 to "off" position breaking the various circuits. Such an arrangement is desirable in order to insure prompt deenergization of the motor as soon as the parking operation has been accomplished. Additionally, if desired, a time delay may be interposed in the switch release mechanism by provision of a one-way-sealing piston 42 in a working cylinder 43 containing the spring 40. Such cylinder is sealed at its bottom end and a restricted air inlet orifice may be adjustably controlled as by a needle valve 44. When the switch 13 is moved to close the various parking contacts shown at the left, Fig. 4 (one being shown at 45 in Fig. 5), the piston 42 moves past a large venting port 46 for the cylinder 43 into the lower part of the cylinder, air escaping freely past the piston on its downward stroke. After release of the switch arm, atmospheric pressure metered through the orifice of valve 44 enables the spring 40 to raise the plunger at first slowly enough so that the relay energizing switch 7 will be certain to be closed, and then quickly opening the switch 13 as the piston 42 unseals the large cylinder port 46.

I claim:

1. In a windshield wiper mechanism, a wiper-connected member adapted and arranged normally to be driven to and from a predetermined position corresponding to a parking position of the wiper through repeating cycles during performance of successive wiper operations, a reversible electric motor having a rotor drivingly connected to said member, manual switch means having two positions connecting the motor to an operating circuit for operating the rotor in its normal wiper-driving direction, a relay circuit means arranged to be supplied with current in one position of said switch means for conditionally or partially establishing a rotor-reversing supply of current to the motor, a complementary switch means in the relay circuit means actuated by said wiper-connected member when in said predetermined position for initiating full operation of the relay circuit means, and a brake operatively connected with the rotor to prevent its reverse rotation whereby to arrest the wiper in parked position.

2. The mechanism according to claim 1 wherein the motor is connected to the wiper-connected member through self-locking reduction gearing operable to hold the wiper in parked position when the motor is disconnected from its operating circuits.

3. The mechanism according to claim 1 wherein the brake restrains rotation of the rotor in the reverse direction only.

4. In a windshield wiper parking mechanism, a reversible electric motor having an operating electric circuit, a wiper-connected member continually moved by forward driving operation of the motor in a repeating cycle to and from a predetermined position, a reversing switch in the circuit, an electromagnetic device arranged for operating the reversing switch to condition the motor electrically for reverse operation, a manual control switch having two motor-circuit-closing positions, both arranged to supply operating current to the motor, one being a parking position, a shunt circuit including said electromagnetic device and partly established by the control switch in its parking position, a normally open switch in the shunt circuit arranged to be closed by said wiper-connected member in its predetermined position for causing operation of the electromagnetic device, and mechanical means arranged to prevent reverse rotation of the motor.

5. A windshield wiper driving mechanism comprising a cyclically operating, wiper-connected member, a reversible, three phase, induction motor mechanically connected with said member to drive it repeatedly through its cycle, three electrical input lines for supplying the motor at respective terminals thereof, spring biased line-reversing switch means normally connecting two of said lines to the motor for normal operation of the motor in a forward direction, an electromagnetic relay and operating branch circuit therefor to operate the reversing switch means and electrically condition the motor for reverse drive, master control switch means for at least two of said input lines and having two positions each capable of energizing the motor for forward drive, the master switch in one of its positions closing a portion of said branch circuit, and another switch in said branch circuit arranged to complete it and being closed by the wiper-connected member in only one position of its operating cycle.

6. An electrically driven windshield wiper mechanism, comprising an electric motor and a wiper-connected part moved cyclically to and from a predetermined position corresponding to a parking position of the wiper, a normal operating electric circuit and a parking electric circuit for the motor, a single master switch having an "off" and two "on" positions, the latter respectively controlling and conditioning said circuits, the parking circuit including a normally open switch arranged to be closed by said wiper-connected part for fully establishing the parking circuit, and a spring biased time delay device operatively arranged in association with the master switch to move said switch to "off" position after parking.

7. In a windshield wiper mechanism, a wiper-connected member adapted and arranged normally to be driven to and from a predetermined position through repeating cycles during performance of successive wiper operations, a reversible electric motor having an operating circuit and a rotor drivingly connected to said member, manual switch means having two positions each similarly connecting the motor to its operating circuit for turning the rotor in its normal wiper-driving direction, a relay having motor-reversing switch means connected in said operating circuit, a relay-energizing circuit partially conditioned for operation of the relay by the manual switch when in only one of its said two positions, a complementary switch means for completing the relay-energizing circuit, said complementary switch means being actuated by said wiper-connected member only when in said predetermined position thereof, and a brake operatively connected with the rotor to prevent its reverse rotation whereby to arrest the wiper in parked position.

8. In a windshield wiper mechanism, a wiper-connected member adapted and arranged normally to be driven to and from a predetermined position through repeating cycles during performance of successive wiper operations, a reversible polyphase electric motor having an operating circuit and a rotor drivingly connected to said member, manual switch means having two positions each similarly connecting the motor to its operating circuit for turning the rotor in its normal wiper-driving direction, a relay having motor-reversing switch means connected in said operating circuit, a relay-energizing circuit partially conditioned for operation of the relay by the manual switch when in only one of its said two positions, a complementary switch means for completing the relay-energizing circuit, said complementary switch means being actuated by said wiper-connected member only when in said predetermined position thereof, and a one-way-operating brake operatively connected with the rotor to prevent its reverse rotation whereby to arrest the wiper in parked position.

COLUMBUS R. SACCHINI.

No references cited.